United States Patent [19]

Czech et al.

[11] 4,280,015
[45] Jul. 21, 1981

[54] HIGH-TENSION LINE

[75] Inventors: Franz Czech, Niederhasli; George-Heinz Krieter, Würenlos, both of Switzerland

[73] Assignee: BBC Brown, Boveri & Company Limited, Baden, Switzerland

[21] Appl. No.: 32,754

[22] Filed: Apr. 24, 1979

[30] Foreign Application Priority Data

May 24, 1978 [CH] Switzerland .................. 5630/78

[51] Int. Cl.³ ............................................ H01B 9/04
[52] U.S. Cl. ................................ 174/28; 174/16 B; 174/110 E; 174/121 R
[58] Field of Search ............... 174/28, 29, 16 B, 99 B, 174/107, 110 E, 121 R, 110 R

[56] References Cited

U.S. PATENT DOCUMENTS

| | | | |
|---|---|---|---|
| 2,956,613 | 10/1960 | Edelman et al. | 174/110 E X |
| 3,610,947 | 10/1971 | Stephanides et al. | 174/28 |
| 3,792,191 | 2/1974 | Perry et al. | 174/28 |
| 3,862,353 | 1/1975 | Morton | 174/121 R X |
| 3,931,451 | 1/1976 | Durschner et al. | 174/28 X |
| 4,038,486 | 7/1977 | Meyer et al. | 174/16 B X |
| 4,092,485 | 5/1978 | Wanse | 174/28 |

Primary Examiner—Arthur T. Grimley
Attorney, Agent, or Firm—Burns, Doane, Swecker & Mathis

[57] ABSTRACT

An encased gas-insulated high-tension line is disclosed especially for regions of the line where disturbing arcs can occur so as to melt a grounding casing of the line. A heat and pressure resistant insulative layer prevents an escape of hot and possibly poisonous insulating gases from the casing in the event of a casing melting. The insulative layer is preferably made of an epoxy resin/-glass fiber fabric and is wound around arc-endangered areas at fixed arc regions. An additional heat-resistant insertion may be included between the casing and the insulative layer.

12 Claims, 3 Drawing Figures

HIGH-TENSION LINE

BACKGROUND AND SUMMARY OF THE PRESENT INVENTION

The present invention relates generally to a high-tension line having a metallic housing section at ground potential, and more particularly relates to a high-tension line having a gas filling.

The present invention is an improvement on the state of the art of encased gas-insulated high-tension lines as described in the published German patent application No. 2 202 401. The casing of the high-tension line is formed in the known arrangement by an insulative material, into which material is imbedded a metallic screen either in a lattice construction or in the form of a foil. The metallic screen which is designed to contain the electric field against the outside, is galvanically connected to grounding bars which are located inside the casing and connected rigidly with the casing. The metallic grounding bars are dimensioned so that they will be able to carry any arising arc current for a longer period of time or to respectively conduct the current to a specific firing point where the arc can continue until the high-tension line is switched off.

The manufacture of an electric screen, embedded in the housing covering made of synthetic materials, is difficult and costly in view of the barrier field strength involved. The grounding bars, which are placed inside the casing, also necessitate an increase in the casing diameter.

Accordingly, it is a primary object of the present invention to provide an encased gas-insulated high-tension line (especially in regions of tension lines that are endangered by arc generation) with an economically produced jacket tube, thereby providing a protection against melting. Furthermore, it is another object to provide a jacket which can be applied in a simple manner and which can be manufactured at low costs.

Still another object is to provide a high-tension line which overcomes the problems of the prior art. The use of a metallic casing has the advantageous result that a gas filling, for example SF6 gas, will not come in contact with the insulative covering which is used as protection against melting. The insulative covering need not be free from inclusions, making it possible to utilize any proper, relatively inexpensive insulative material. It is also feasible to improve the arc protection of already existing installations, or to increase their short-circuit power if necessary, by a supplemental application of the insulative covering without the need for disassembly or shut-down of the system. The insulative covering will also provide the casing with a greater strength against cracking. The diameter of the casing can be held to an optimum size and is not influenced by any danger of local arc formation.

BRIEF DESCRIPTION OF THE DRAWINGS

Preferred embodiments of a high tension line according to the present invention are described with reference to the accompanying drawings wherein like members bear like reference numerals and wherein.

DETAILED DESCRIPTION OF THE PREFERRED EMBODIMENTS

Figure 1:
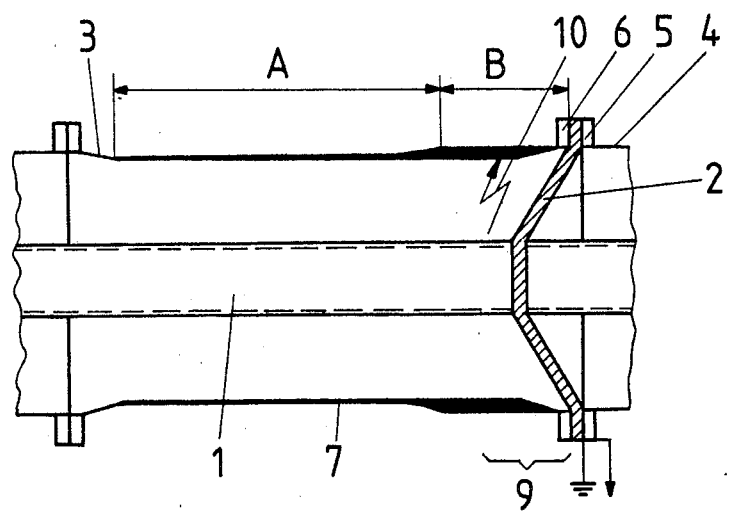
FIG. 1 is a partial cross sectional view of an encased gas-insulated high-tension line according to the present invention.

With reference now to FIG. 1, one section of a high-tension line has an electric current conductor 1 which is held, electrically insulated against first and second grounded metallic casings 3 and 4, by a voltage insulator or by an insulating support 2. The metallic casing includes one or more cylindrical tubes which are connected gas-tight with each other by cooperating flanges 5 and 6. The insulating support 2 can be inserted gas-tight between these flanges or alternatively can be arranged in recesses (not shown) of the flanges.

The thickness of the walls of the metallic tubes is arranged in accordance with the actual gas pressure within the tubes which can be as high as 10 bar. If aluminum tubing is used, the wall thickness will range from about 2 to about 12 mm, with aluminum tubes of lesser strength preferably consisting of spirally welded aluminum strips.

A heat and pressure resistant insulative layer 7, made of a synthetic resin, especially an epoxy resin and a glass fiber fabric, or glass fiber roves imbedded in a synthetic resin, is applied to arc-endangered areas A and B of the metallic tube. Thermosetting plastics are suitable for the insulative layer but thermoplastics are not suitable because the thermoplastics will become liquefied by the heat generated by a disturbing arc 10. Arc-endangered areas are especially prevalent in tube sections of reduced tube diameter or reduced wall thickness, or within tube sections having for example conductor lead-throughs, angled conductor leads, or sections with a steep conductor curvature. Other arc-endangered areas are fixed burning points, the so-called arc firing points, such as insulating supports and the like which arrest the arc straying from the generating current source. It is further necessary to protect regions of any associated housing where there is a danger of melting by the passing hot gases, especially within the regions between the fixed burning points of an arc and the external pressure relief points.

If the malfunction causing the arc is not eliminated in time by the safety devices of the system, the metallic casing can melt or can develop a welding hole. The hot and possibly poisonous gases may then emerge under pressure and become a danger for any personnel on the scene. Such a danger exists especially in the case of non-supporting switchgear parts having a rather low wall thickness where the operating pressure need not greatly exceed the atmospheric pressure, for example, if heavy gases such as SF6 are being employed. The insulative layer 7, which consists of a heat resistant and fireproof material, will not offer any hold to the base of the arc due to the high electrical resistance of the layer 7 and will prevent the gas from leaving a melted metallic tube due to the pressure and heat stability of the layer 7.

The insulative layer 7 is applied most advantageously by a surface-winding technique and by simultaneously applying a tensile stress to the layer 7. A bandage produced in this manner should have a thickness of at least 2 mm. Fixed arc regions 9 in the vicinity of arc firing points should be covered by a bandage B of at least 5 mm thickness, extending approximately 400 to 500 mm across the length of the metallic tube.

Figure 2:
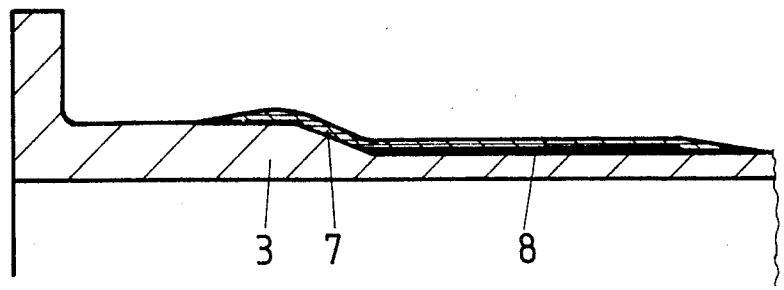
FIG. 2 is a partial cross sectional view of a housing wall section of a gas-insulated high-tension line with coverings of synthetic material applied to arc-endangered areas.

With reference now to FIG. 2, a heat and presssure resistant insulative layer 7 is provided at a metallic casing 3. An arc-endangered, thin-walled tube section of the metallic casing is additionally protected either by a heat-resistant and insulating intermediate layer or by an insertion 8, made for example of asbestos, which insertion is placed between the insulative layer 7 and the metallic casing 3. The insertion 8 reinforces the strength to oppose a melting of the casing caused by any interfering arc being generated. The insertion 8 need not be pressure resistant. The melting point of the material used for the insertion 8 should be above about 1000° C.

Figure 3:
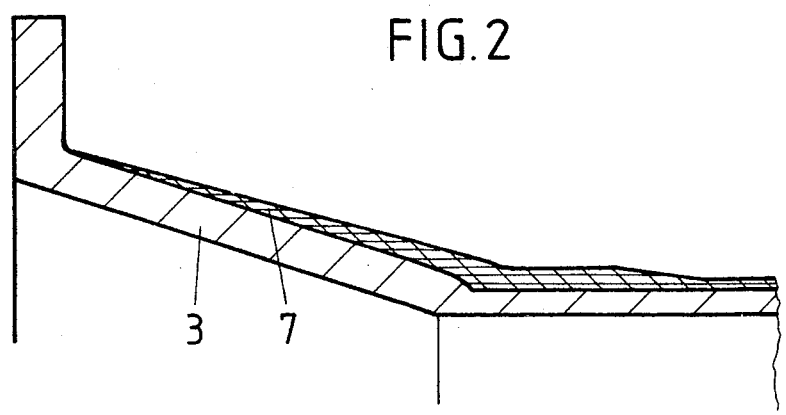
FIG. 3 is a partial cross sectional view of another housing wall section of a gas-insulated high-tension line with a covering of synthetic material applied to arc-endangered areas.

With reference now to FIG. 3, areas of the metallic casing 3 which are subject to a greater, dangerous influence by arcs (that is, thin-walled tube sections of smaller tube diameter), are covered by a more heavy heat and pressure resistant insulative layer 7. The winding can be varied as to the thickness of the layer, making it possible to produce a suitable thickening at particularly endangered areas. The winding can contain up to 20 layers at the arc base points and must be able to sustain the gas pressure arising at all arc-endangered points. A prestress of the winding and/or a thermal hardening of the resin will increase the cracking-preventing strength of the metallic casing.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. An electric line, especially a high-tension line, comprising:
   a metallic casing which includes an arc-endangered portion of the casing;
   a conductor arranged within said metallic casing;
   a first electrically insulative covering extending around and outside said arc-endangered portion of the metallic casing, which covering includes a heat and pressure resistant insulative tape material wound about said portion of the metallic casing.

2. The electric line of claim 1 wherein the metallic casing is of aluminum.

3. The electric line of claim 1 wherein the metallic casing is sealed with respect to the conductor and wherein a gas is contained within the metallic casing.

4. The electric line of claim 3 wherein the insulative covering is formed of a synthetic resinous material.

5. The electric line of claim 4 wherein the insulative covering is formed of an epoxy resin having a reinforcement of glass fibers.

6. The electric line of claim 5 further comprising:
   a second insulative covering provided between the metallic casing and the first insulative covering; the second insulative covering having a melting temperature of at least about 1000° C.

7. The electric line of claim 6 wherein the second insulative covering is of asbestos.

8. The electric line of claim 1 wherein the first insulative covering includes at least a single wind of said insulative tape material about said portion of the metallic casing.

9. The electric line of claim 1 wherein the first insulative covering includes a multiple wind of said insulative tape material about said portion of the metallic casing.

10. The electric line of claim 1 wherein said insulative covering is under a tensile stress.

11. The electric line of claim 1 further comprising a second insulative covering provided between the metallic casing and the first insulative covering.

12. The electric line of claim 1 wherein said insulative tape material is wound more heavily about a first portion of the metallic casing and less heavily about a second portion of the metallic casing, said first portion being subjected to a greater danger of arcing than said second portion.

* * * * *